(No Model.)

W. H. BARNARD.
BROILER.

No. 580,753. Patented Apr. 13, 1897.

Witnesses:
J. B. McGivr.
J. P. Appleman.

Inventor.
William H. Barnard,
By Hanson & Hanson,
his Attorneys.

UNITED STATES PATENT OFFICE.

WILLIAM H. BARNARD, OF NORFOLK, VIRGINIA.

BROILER.

SPECIFICATION forming part of Letters Patent No. 580,753, dated April 13, 1897.

Application filed January 2, 1897. Serial No. 617,797. (No model.)

*To all whom it may concern:*

Be it known that I, WILLIAM H. BARNARD, a citizen of the United States, residing at Norfolk, county of Norfolk, State of Virginia, have invented certain new and useful Improvements in Broilers, of which the following is a specification.

My invention relates to broilers, and has for its object the provision of a broiler in which food, such as meat, &c., may be subjected to the action of the heat upon both sides thereof at the same time and under substantially the same temperature, so that the broiling action may be effected in the most thorough and effective manner. My further object is to provide a simple, durable, and effective device for broiling in which the gravy or juices from meat and other articles may be prevented from igniting, and thereby avoiding the smell or odor usually attending the cooking of meat, &c., by broiling as practiced prior to my invention.

With these general objects in view my invention consists in a novel construction and details thereof, as hereinafter described, and more particularly pointed out in the claims, with reference to the accompanying drawings, in which—

Figure 1:
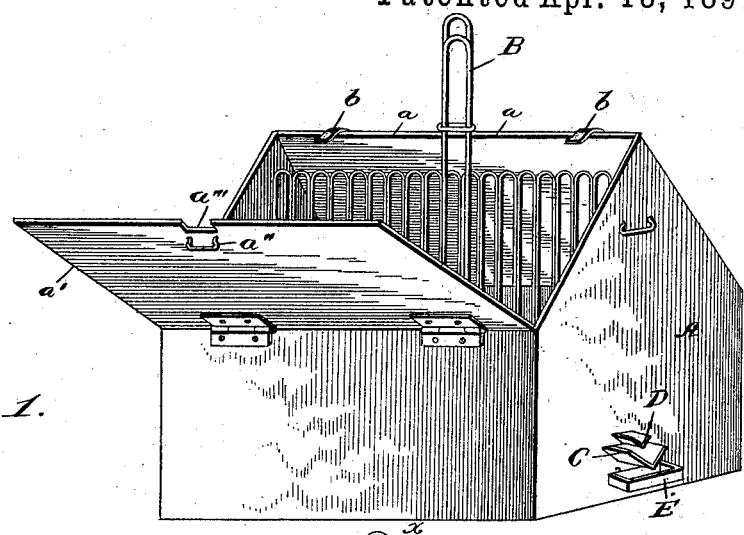
Figure 2:
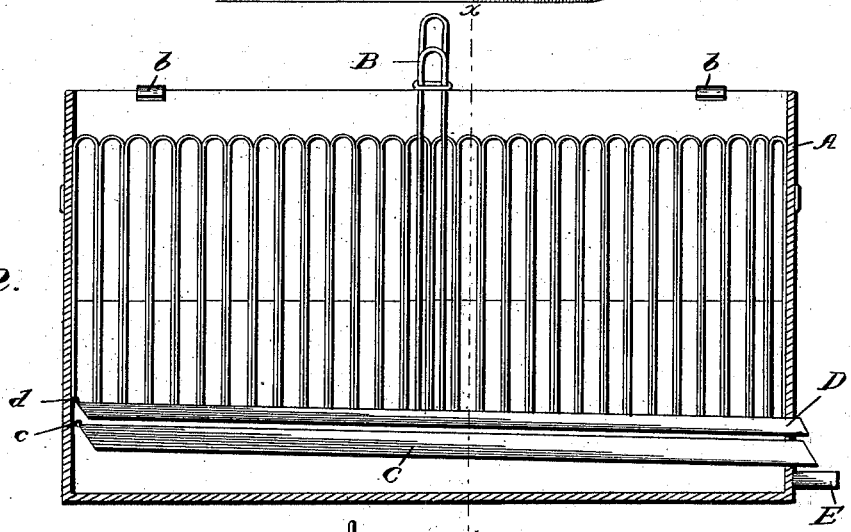
Figure 3:
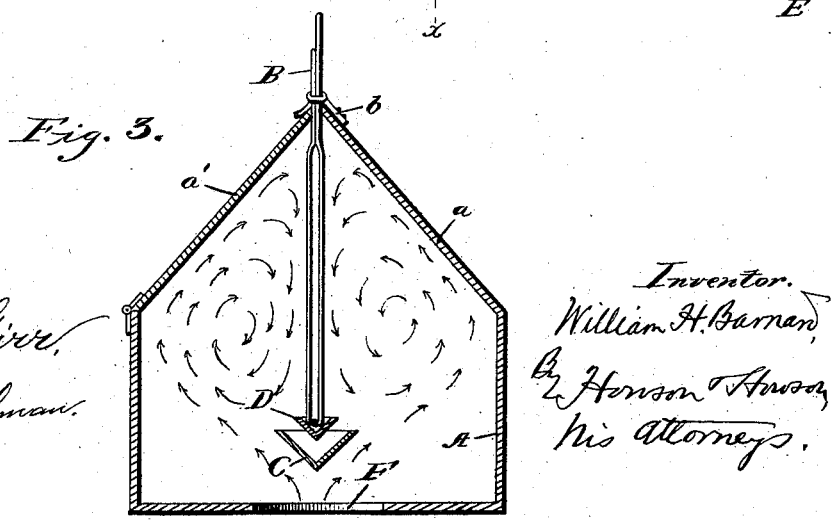

Figure 1 is a perspective view of my improved broiler. Fig. 2 is a vertical longitudinal section thereof. Fig. 3 is a transverse section on the line $x\ x$, Fig. 2.

In the drawings, in which the same reference-characters refer to the same or corresponding parts in all the views, A designates a suitable box or casing, of metal or other suitable material, preferably of the oblong shape shown, along the bottom of which casing is a slot or opening F, through which the products of combustion from a lamp, oil or gas burner, or other source of heat pass into the broiler-box A. The bottom of the casing A may be preferably closed, with the opening as shown, or it may be left entirely open, for example, when it is desired to use the broiler over a range or stove, and I have shown the opening F simply as the preferred form; but it is to be understood that my device is intended for and is capable of use with a gas, oil, or gasolene stove or other ordinary burners now in use.

The top of the broiler-casing has, preferably, inclined or sloping sides $a\ a'$, the latter of which is joined to the side of a broiler by a hinge connection, thus forming a lid, and is provided with a suitable handle $a''$ for opening and closing the same, two lips $b$ or other suitable fastening means being attached to the fixed sloping side $a$ for the purpose of securing the lid in its place when closed.

Suitably supported in an inclined position just above the heat-opening near the bottom of the casing is a V-shaped heat-deflector C, which is preferably removably secured by a hook and eyelet or staple $c$ at the elevated end to the end of the casing A, the opposite end of such deflector passing through an opening at the other end of the casing and extending over a drip-pan E, preferably removably attached to the end of said casing by any suitable means.

Supported just above the heat-deflector is a gravy-trough D, similarly inclined and removably attached by a hook and staple or eyelet or other suitable fastening $d$ to one end of the casing A and passing through an opening in the other end thereof and so arranged as to discharge the juice and gravy into the catch-pan E.

The broiling-iron B may be of ordinary construction, such as that shown, the handles of which when in position for use within the broiler-casing pass upwardly through the slot $a'''$ in the lid $a'$ at the top of the casing, the lower portion of the iron resting in the gravy-trough D, the latter of which, as shown, preferably projects slightly below the top of the heat-deflector, so that any juices or gravy that may flow over the top of said trough will pass into the said heat-deflector and naturally flow into the catch-pan E.

Fig. 3 shows the broiler in its proper position for use, in which figure it is noted that the arrows indicate the course which the heat-rays and products of combustion take after they enter the broiler-casing. I may now state that I consider my arrangement of heat-deflecting surfaces, which are constituted of heat-deflector trough C and sloping sides $a\ a'$, an important feature of advantage, inasmuch as the heat as it rises from the burners through the opening F strikes first the heat-deflector and is by such deflector thrown off to the sides of the broiler-casing, and, as the sides $a\ a'$ are inclined or sloping, the said heat-rays upon striking said sides are deflected and thrown back to the center of the broiler-casing, giving to the rays a slightly rotary motion and causing them to strike the article held by the broiling-iron as uniformly as possible on both sides thereof, thus subjecting the said material to a uniform action, and, inasmuch as the heat-deflector C prevents the heat from coming in direct contact with the food at the bottom of the broiler, said food will not cook at this point any quicker than at the top. Furthermore, by providing a heat-deflector in addition to and separated from the gravy-trough, with the space between the two, the heat as it enters the broiler-casing is prevented from coming in direct contact with the gravy, thereby preventing the gravy from becoming ignited, and thus avoiding to a considerable extent the disagreeable smell or odor attending the broiling as usually practiced.

It will be observed that my broiler-casing is preferably oblong in shape, so that it will fit over two or more burners at the same time, thus admitting a large amount of heat, which is an important desideratum in the broiling, and that, inasmuch as the meat or other food is sustained in a vertical position and is subjected to the action of heat evenly on both sides at the same time, the broiling of the food is accomplished in the quickest and most effective and uniform manner.

While I have shown the preferred form of my invention, it will be observed that changes may be made in the details thereof without departing from the spirit. For example, the heat-deflector and the gravy-trough instead of being V-shaped may have rounded outer surfaces, and similarly the straight sloping sides may be modified, and other changes may be made without materially departing from the essential features of my invention.

What I claim is—

1. In a broiling device a closed casing provided with a gravy-trough, extending substantially along the center thereof near the bottom, the said casing being provided with an opening in the bottom for admission of heat from a suitable source, in combination with a broiling-iron centrally supported therein over said gravy-trough, and a heat-deflector with inclined sides arranged below said gravy-trough and extending centrally over the opening in the bottom of the casing for deflecting the heat to both sides of said broiler, substantially as described.

2. In a broiling device, a casing provided with a gravy-trough, extending substantially along the center thereof near the bottom, the said casing being open at the bottom for admission of heat from a suitable source and provided with means for closing the top, in combination with a broiling-iron centrally supported therein over said gravy-trough, and a heat-deflecting trough separated from the gravy-trough for deflecting the heat to both sides of the broiling-iron whereby the heat is deflected to both sides of the broiler and direct contact of the heat with the bottom of the broiler is prevented, substantially as described.

3. In a broiling device a closed casing provided with an inclined gravy-trough extending substantially along the center thereof near the bottom, the said casing having an opening in the bottom for admission of heat from a suitable source and provided with means for closing the top, in combination with a broiling-iron centrally supported therein over said gravy-trough, and an inclined heat-deflecting trough separated from and supported below said gravy-trough for deflecting the heat to both sides of the broiling-iron and having a space between the two troughs, whereby gravy overflowing from the gravy-trough is caught by the deflecting-trough and direct contact of the heat with the gravy-trough is prevented, substantially as described.

4. In a broiling device, a casing provided with a gravy-trough extending substantially along the center thereof near the bottom for admission of heat from a suitable source and provided with means for closing the top, in combination with a broiling-iron centrally supported therein over said gravy-trough, and a heat-deflecting trough for deflecting the heat to both sides of the broiling-iron and separated from the gravy-trough so as to provide a space between the two troughs for preventing the heat from igniting the gravy and juices in the trough, and a drip-pan attached to the outside of the casing below the deflecting and gravy troughs, into which pan both troughs discharge, substantially as described.

5. In a broiling device, a casing provided with an opening in the bottom for the admission of heat from a suitable source to said casing, in combination with a broiling-iron supported substantially along the center of said casing over the opening in the bottom, a heat-deflector below said broiling-iron for causing the heat-rays and products of combustion to be deflected toward both sides of the casing, and heat-deflecting surfaces arranged to cause the said heat to be deflected onto both sides of the broiling-iron, substantially as described.

6. In a broiling device a closed casing having a sloping top and provided with an opening in the bottom for the admission of heat to said casing, a heat-deflector supported along substantially the central line of said casing at the bottom and over the heat-opening, in combination with a broiling device vertically supported within the casing over said heat-deflector, substantially as described.

7. In a broiling device, a closed casing having a sloping top and provided with an opening in the bottom for the admission of heat to said casing, a gravy-trough supported substantially along the central line of said casing near the bottom and over the heat-opening therein, a heat-deflector extending through said casing under the gravy-trough in combination with a broiling device vertically supported over said gravy-trough in said casing, substantially as and for the purpose specified.

In testimony whereof I have signed my name to this specification in the presence of two subscribing witnesses.

WILLIAM H. BARNARD.

Witnesses:
W. J. BAXTER, Jr.,
R. A. MAPP.